US012787140B2

(12) United States Patent
Bouvigne et al.

(10) Patent No.: US 12,787,140 B2
(45) Date of Patent: Nov. 3, 2026

(54) MANAGING AMBIENT LIGHT ACCORDING TO THE PROGRAMME

(71) Applicant: SAGEMCOM BROADBAND SAS, Bois-Colombes (FR)

(72) Inventors: Gabriel Bouvigne, Bois-Colombes (FR); Piero Indiveri, Bois-Colombes (FR)

(73) Assignee: SAGEMCOM BROADBAND SAS, Bois-Colombes (FR)

( * ) Notice: Subject to any disclaimer, the term of this patent is extended or adjusted under 35 U.S.C. 154(b) by 0 days.

(21) Appl. No.: 18/679,773

(22) Filed: May 31, 2024

(65) Prior Publication Data

US 2024/0407071 A1 Dec. 5, 2024

(30) Foreign Application Priority Data

Jun. 2, 2023 (FR) ...................................... 2305555

(51) Int. Cl.
*H05B 47/165* (2020.01)
*H05B 47/105* (2020.01)

(52) U.S. Cl.
CPC ......... *H05B 47/165* (2020.01); *H05B 47/105* (2020.01)

(58) Field of Classification Search
CPC .... H05B 47/165; H05B 47/105; H05B 47/11; H05B 47/175; H05B 47/19
See application file for complete search history.

(56) References Cited

U.S. PATENT DOCUMENTS

| | | | | |
|---|---|---|---|---|
| 8,576,340 B1 * | 11/2013 | Li | H04N 5/58 348/602 |
| 2010/0177247 A1 * | 7/2010 | Sekulovski | H05B 47/10 348/602 |
| 2014/0104247 A1 * | 4/2014 | Li | A63F 13/53 345/204 |
| 2014/0104498 A1 * | 4/2014 | Li | H05B 47/1985 348/602 |
| 2014/0142762 A1 * | 5/2014 | Li | H04N 21/81 700/275 |
| 2015/0089551 A1 * | 3/2015 | Bruhn | H04N 5/58 725/80 |
| 2019/0099668 A1 * | 4/2019 | Aliakseyeu | A63F 13/212 |
| 2021/0400227 A1 * | 12/2021 | Wong | G06V 20/46 |
| 2022/0039239 A1 * | 2/2022 | Rycroft | H05B 47/155 |

FOREIGN PATENT DOCUMENTS

| | | | | |
|---|---|---|---|---|
| DE | 10252698 B3 | 8/2004 | |
| EP | 4472358 A1 * | 12/2024 | H05B 47/105 |
| EP | 4637273 A1 * | 10/2025 | H05B 47/19 |
| WO | WO-2020089150 A1 * | 5/2020 | H05B 47/155 |

* cited by examiner

*Primary Examiner* — Seokjin Kim
(74) *Attorney, Agent, or Firm* — Muncy, Geissler, Olds & Lowe, P.C.

(57) ABSTRACT

A method for managing ambient light, implemented in a set-top box, which is connected to a viewing device and to a lighting device, includes the steps of detecting a start of a broadcasting of a first current programme, selecting, in a light parameter base, first current values of light parameters, which are associated with programme metadata corresponding to the first current programme, transmitting a first command to the lighting device, such that this adjusts the ambient light, according to said first current values of the light parameters.

14 Claims, 5 Drawing Sheets

[Fig. 1]
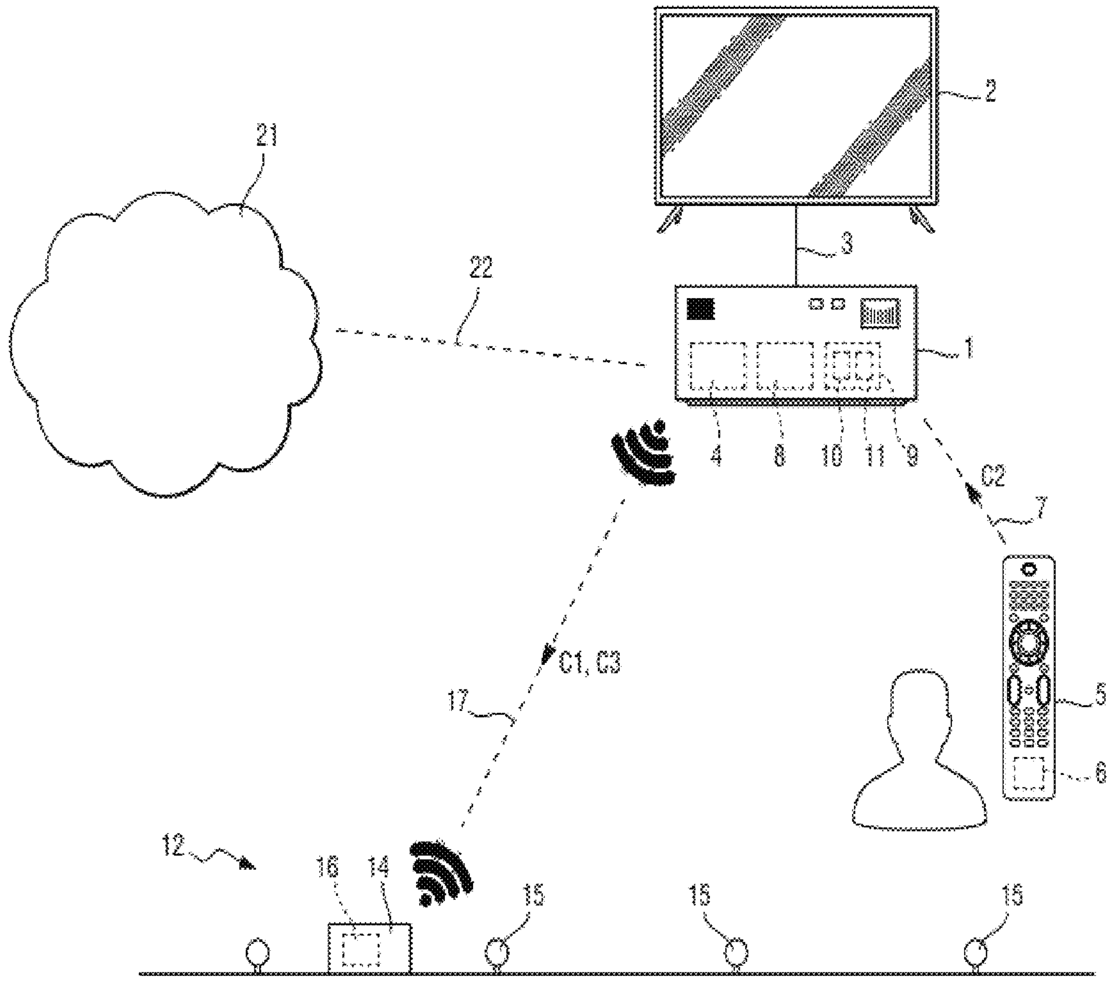

[Fig. 2]
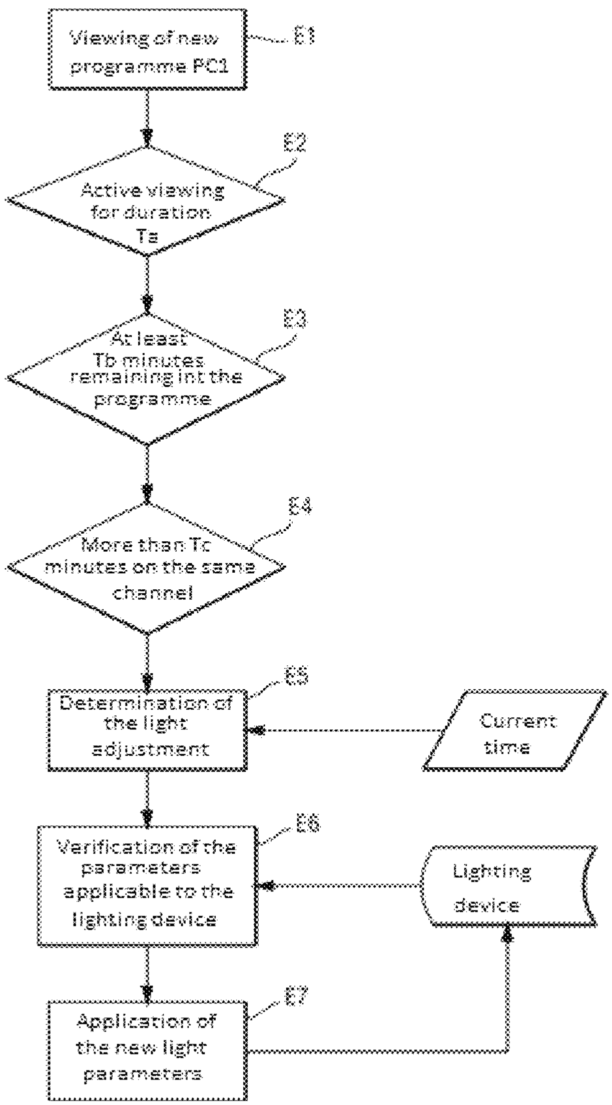

[Fig. 3]
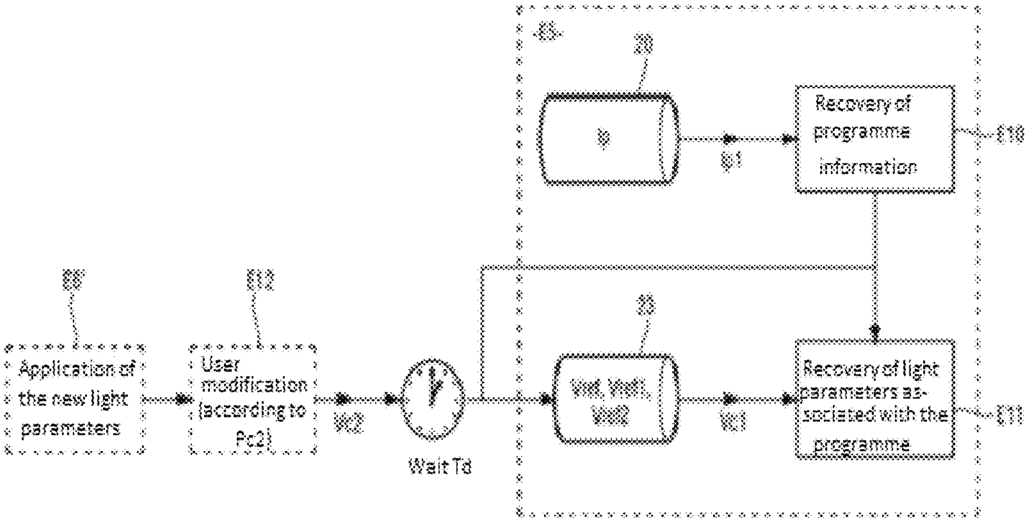

[Fig. 4]
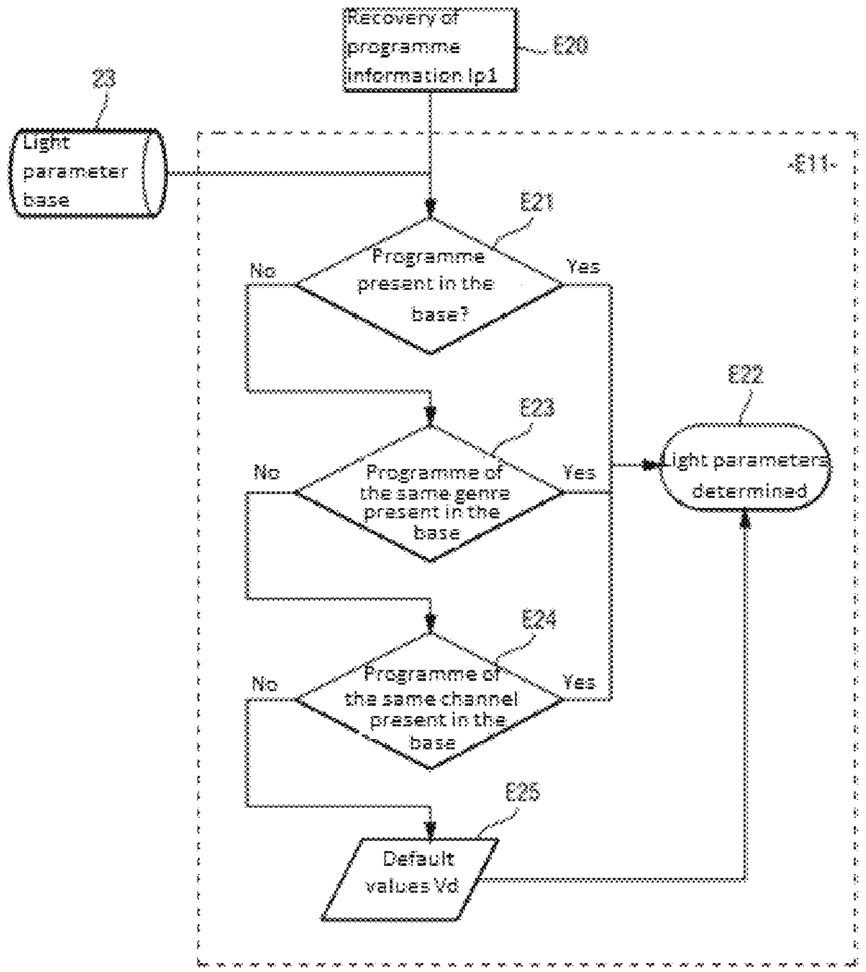

[Fig. 5]
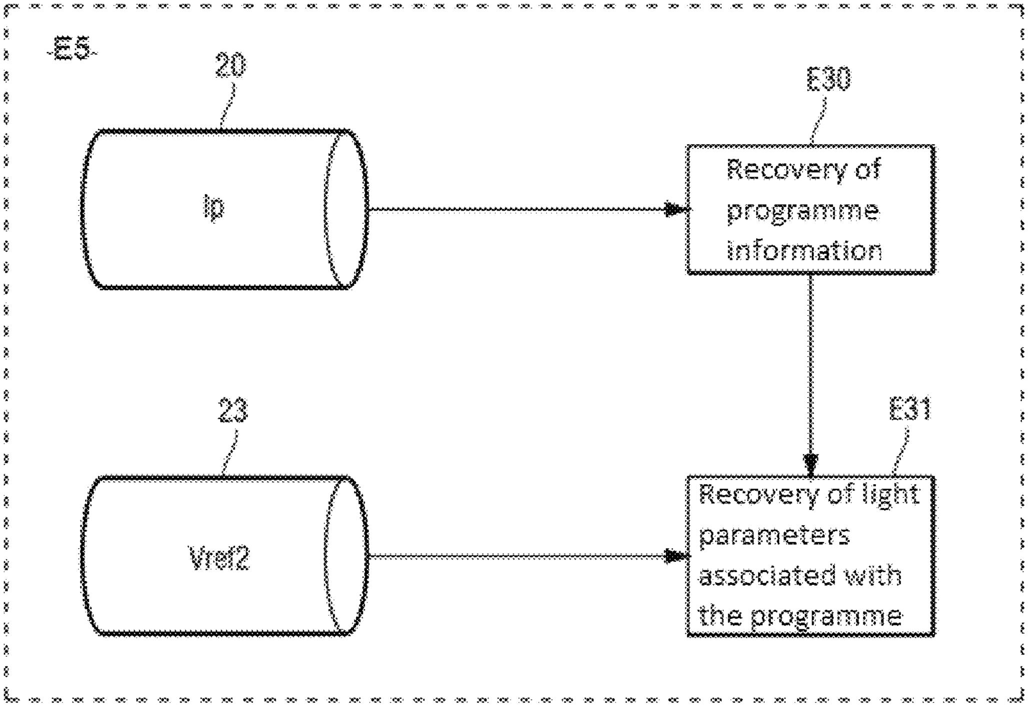

MANAGING AMBIENT LIGHT ACCORDING TO THE PROGRAMME

The invention relates to the field of set-top boxes and managing lighting during the viewing of a programme.

BACKGROUND OF THE INVENTION

In the field of televisions, systems are known which act on ambient light to improve the viewing comfort and/or the "immersion" impression felt by the user.

Certain televisions are thus provided with a system comprising a backlighting device and a control module which controls the backlighting device to provide the colour and the luminosity of the backlighting according to the colour and to the luminosity of the current image. The control module is based on an analysis of the pixels of the current image to control the backlighting device.

It is also possible to connect one or more light bars to the television, to obtain relatively similar lighting effects.

Also, a home automation system is known, which makes it possible to adjust ambient light according to the use of the television. Such a system detects the operation of the television by using a smart plug socket. This system makes it possible, in particular, to adjust the lighting of the room to attenuate the contrast between the screen of the television and its environment when the television is used.

AIM OF THE INVENTION

The invention aims, during the broadcasting of a programme on a viewing device, to improve the user experience by improving the adjustment of light.

SUMMARY OF THE INVENTION

In view of achieving this aim, a method for managing ambient light is proposed, implemented in a set-top box which is connected to a viewing device and to a lighting device arranged to adjust ambient light, the management method comprising the steps of:

- detecting a start of a broadcasting of a first current programme;
- accessing a light parameter base comprising light parameter reference values associated with programme metadata;
- selecting, in the light parameter base, first current values of said light parameters, which are associated with programme metadata corresponding to the first current programme;
- transmitting a first command to the lighting device, such that this adjusts the ambient light according to said first current values of the light parameters.

The set-top box transmits to the viewing device, a stream comprising the first current programme, such that this can be viewed by the user.

The set-top box therefore has access to information associated with the first current programme (ID, genre, subgenre, start time, end time, etc.). This information enables it to select, in the light parameter base, light parameter values which are the most relevant with respect to the first current programme.

The set-top box can therefore command the lighting device, such that this, from the start of broadcasting of the first current programme, and until the end of its broadcasting, adjusts the ambient light according to the features of the first current programme. The light adjustments are very relevant and very effective (at the immersion and viewing comfort level, in particular), as they are made according to the current programme itself.

In addition, a management method such as described above is proposed, wherein the light parameter base comprises first reference values of light parameters associated with first programme metadata, said first reference values being defined by the user.

In addition, a management method such as described above is proposed, wherein the set-top box is arranged to:

- receive a second command from the user who wishes to adjust the ambient light, while a second current programme is being broadcast;
- produce second current values of the light parameters according to the second command;
- transmit a third command to the lighting device, such that this adjusts the ambient light according to said second current values;
- store the second current values in the light parameter base, by associating them with the metadata of the second current programme, such that the first reference values thus comprise the second current values, and the first programme metadata thus comprise said metadata of the second current programme.

In addition, a management method such as described above is proposed, wherein the set-top box is arranged to, before storing the second current values in the light parameter base, verify that, following the receiving of the second command, the user has not attempted to adjust the ambient light again during a predefined first duration.

In addition, a management method such as described above is proposed, wherein the light parameter base comprises second reference values of the light parameters associated with second programme metadata, said second reference values being stored in the light parameter base by a third-party external system.

In addition, a management method such as described above is proposed, wherein the set-top box is arranged to wait for the first current programme to have been broadcast during a predefined second duration, before transmitting the first command to the lighting device.

In addition, the management method such as described above is proposed, wherein the set-top box verifies, before transmitting the first command to the lighting device, that at least one predefined third duration of the first current programme to be broadcast still remains.

In addition, a management method such as described above is proposed, wherein the set-top box verifies, before transmitting the first command to the lighting device, that the user remains on a channel broadcasting the first current programme for at least one predefined fourth duration.

In addition, a management method such as described above is proposed, wherein the set-top box verifies, before transmitting the first command to the lighting device, that the first current values are compatible with an operation of the lighting device.

In addition, a management method such as described above is proposed, wherein the set-top box comprises a detection device arranged to detect a presence of the user in a room wherein the set-top box is located, and wherein the set-top box is arranged to verify, before transmitting the first command to the lighting device, that the user is actually present in said room.

In addition, a management method such as described above is proposed, wherein the set-top box is arranged to, when it selects in the light parameter base, the first current values according to the first current programme:

verify that the programme metadata of the light parameter base actually comprise a first ID of the first current programme;

if this is the case, select the reference values associated with the first ID;

if this is not the case, verify that the programme metadata comprise a second ID of a genre and/or of a sub-genre of the first current programme and, if this is the case, select the reference values associated with the second ID.

In addition, a management method such as described above is proposed, wherein the set-top box is arranged to, if the programme metadata of the light parameter base does not contain the second ID:

verify that the programme metadata comprise a third ID of a channel on which the first current programme is broadcast and, if this is the case, select the reference values associated with the third ID.

In addition, a management method such as described above is proposed, wherein the set-top box is arranged to, if the light parameter base does not contain the third ID, select default values of the light parameters.

In addition, a management method such as described above is proposed, wherein the light parameter base is stored in the set-top box.

In addition, a set-top box is proposed, comprising a processing unit, wherein the management method such as described above is implemented.

In addition, a computer program is proposed, comprising instructions which make the processing unit of the set-top box such as described above run the steps of the management method such as described above.

In addition, a recording medium which can be read by a computer is proposed, on which the computer program such as described above is recorded.

The invention will be best understood in the light of the description below of particular, non-limiting embodiments of the invention.

BRIEF DESCRIPTION OF THE DRAWINGS

Reference will be made to the accompanying drawings, among which:

FIG. 1 represents a television, a set-top box, a lighting device, an external data source and a user;

FIG. 2 represents the steps of the method for managing the lighting;

FIG. 3 represents the steps of a method for determining the adjustment of the light parameters, according to a first embodiment;

FIG. 4 represents the steps of a method for recovering the first current values of the light parameters;

FIG. 5 represents the steps of a method for determining the adjustment of the light parameters, according to a second embodiment.

DETAILED DESCRIPTION OF THE INVENTION

In reference to FIG. 1, a set-top box 1 is connected to a viewing device, in this case, to a television 2, by a connection 3. This connection 3 is, for example, an HDMI-type (High Definition Multimedia Interface), SCART-type (Syndicat des Constructeurs d'Appareils Radiorécepteurs et Téléviseurs—Radio and Television Receiver Manufacturers' Association) connection, or any other suitable type of connection.

The primary functions of the set-top box 1 consist of receiving an audio-video stream, to process it, to separate the audio stream and the video stream, and to transmit the audio stream and the video stream to the television 2. The television 2 thus broadcasts the video stream via its screen, and the audio stream via its speakers.

The audio stream, or at the very least, one or more channels of the audio stream, can also optionally be broadcast by one or more of the speakers possibly integrated in the set-top box 1, or by other audio playback equipment (for example, a soundbar, one or more smart speakers, etc.).

The audio-video stream can come from any source, which is, for example, a broadcasting network (satellite television network, internet connection, digital terrestrial TV (DTTV) network, cable television network, etc.), another piece of equipment connected to the set-top box 1 (a CD, DVD or BlueRay player, a smartphone, a tablet, etc.), or also a storage medium (and, for example, a USB stick or a memory card connected to the set-top box 1).

The audio-video stream comprises programmes. By "programme", this means, in this case, any type of audiovisual sequence having a start and an end: film, series, news, sports event, musical, commercial, etc.

The set-top box 1 comprises a communication module 4.

The user can interact with the set-top box 1 by means of a remote control 5 which also comprises a communication module 6 enabling this interaction.

The connection 7 implemented via the communication module 5 and the communication module 6 is, for example, an infrared signal connection.

The user can also possibly communicate with the set-top box 1 by other means, and for example, via an app programmed on their smartphone, via physical buttons of the set-top box 1, etc.

The set-top box 1 comprises, in addition, a communication module 8. The communication module 8 is, in this case, integrated in a home automation controller, itself integrated in the set-top box 1.

The set-top box 1 comprises, in addition, a processing unit 9. The processing unit 9 is an electronic and software unit. The processing unit 9 comprises one or more processing components 10, and for example, any processor or microprocessor, general or specialist (for example, a DSP, Digital Signal Processor, or a GPU, Graphics Processing Unit, or also an NPU, Neural Processing Unit), a microcontroller, or a programmeable logic circuit, such as an FPGA (Field Programmeable Gate Array) or an ASIC (Application-Specific Integrated Circuit).

The processing unit 9 also comprises one or more memories 11 (and in particular, one or more non-volatile memories), connected to or integrated in the processing component 10. At least one of these memories 11 forms a recording medium which can be read by a computer, on which at least one computer program is recorded, comprising instructions which make the processing component run at least some of the steps of the method for managing the ambient light, which will be described below.

The set-top box 1 comprises, in addition, a camera, positioned at its front face. The set-top box 1 comprises, in addition, microphones, positioned at its upper face. The set-top box 1 also comprises a proximity sensor. These components are not represented in FIG. 1.

The set-top box 1 is, in addition, connected to a lighting device 12, which makes it possible to adjust an ambient light.

The lighting device 12 comprises, in this case, a control unit 14 and light sources 15 connected to the control unit 14.

The control unit 14 controls the light sources 15 to adjust the ambient lighting of the room, wherein the set-top box 1, the television 2 and the lighting device 12 are located. The ambient lighting is adjustable according to various light parameters, for example, the illumination/switching off of the light sources 15, the colour, the intensity or the colour temperature.

The control unit 14 comprises a communication module 16.

The set-top box 1, via its communication module 8, can communicate with the control unit 14, via its communication module 16.

A connection 17 is therefore established between the communication modules 8, 16.

This connection 17 can be a wired connection, or use radio, infrared (by using, for example, IrDA technology), light (by using, for example, LiFi technology) signals, or any other suitable type of signals.

The communication protocol used can be, for example, a Bluetooth, ZigBee, Z-Wave-type protocol, or also any type of protocol which is exposable via communication interfaces, such as, for example, those used for home automation applications.

The connection 17 can be established via a direct access to the communication network shared between the set-top box 1 and the control unit 14, for example, in the case where a compatible radio interface exists in the set-top box 1. This is, for example, the case for a Wi-Fi connection, or if the set-top box 1 is provided with ZigBee/Z-Wave radio interfaces.

The fact that the set-top box 1 and the control unit 14 are directly connected to the same communication network does not compulsorily mean that the connection 17 is a direct connection. The connection can be established indirectly, by means of one or more relays. This is, for example, the case, if an external Wi-Fi access point is used, or in a mesh network, if one or more intermediate nodes are necessary to establish a route between the set-top box 1 and the control unit 14.

The connection 17 can also be made by means of an external gateway (home automation gateway), which could perform a translation of protocols, and thus enable a connection 17 between the set-top box 1 and the control unit 14, without them having a protocol in common. This could, for example, be the case for a gateway exposing, via the http protocol, the parameters of the control unit 14, which would communicate in ZigBee, or also via a router border (network gateway) which would expose, via the http protocol, the equipment of a Thread-type network (which is a low-consumption mesh network technology).

Now, in reference to FIG. 2, the different steps of the method for managing ambient light are described.

The processing unit 9 of the set-top box 1 first detects the start of the broadcasting of a first current programme Pc1, which is viewed by the user: step E1.

Detecting the broadcasting of this new programme can be done in different ways.

The processing unit 9 can, for example, detect the start of a new programme on a channel being viewed.

The processing unit 9 can also detect the start of the reading of a VOD or PVR content.

The processing unit 9 can also detect a change of channel (zapping).

Following the detection of the start of the broadcasting of the first current programme Pc1, the processing unit 9 will control the control unit 14 of the lighting device 12, via the connection 17, such that the lighting device 12 adjusts the ambient light according to the first current programme. The processing unit 9 sends, for this, a first command C1 to the control unit 14.

However, before transmitting the first command C1 to the lighting device 12, the processing unit 9 waits for the first current programme to be broadcast for a predetermined duration Ta: step E2. This predetermined duration Ta is, for example, equal to 60 seconds or 120 seconds.

This step E2 aims to avoid unintentional adjustments, for example when the user is in the process of zapping between channels.

Step E2 is optional.

The processing unit 9 then verifies, before transmitting the first command C1 to the lighting device 12, that at least one predefined duration Tb of the first current programme to be broadcast also remains: step E3. This predefined duration is, for example, equal to 5 minutes or 10 minutes.

This step E3 aims to avoid too frequent adjustments, for example, during sequences of short programmes.

Step E3 is optional.

If the first current programme is broadcast on a channel, the processing unit can also verify, before transmitting the first command C1 to the lighting device 12, that the user remains on the channel broadcasting the first current programme for at least one predefined duration Tc: step E4.

For example, the situation arises, where the user is in the process of "zapping". The user remains, for example, for 30 seconds to 1 minute on each channel, before moving to the next one. In this case, it is preferable to avoid the light changing upon each change of channel. Therefore, a 1 minute delay (Tc) is provided, before modifying the light.

Step E4 is optional.

The processing unit 9 thus determines first current values of light parameters, associated with the first current programme, which will be used to adjust the ambient light: step E5.

Then, the processing unit 9 verifies one or more conditions on the applicability of the first current values of the light parameters.

The condition(s) can be defined by the user. These conditions must be verified, such that the processing unit 9 considers that the adjustment of the lighting, corresponding to the first current values of the light parameters, is authorised.

The user can indeed prohibit the adjustment of certain light parameters, or prohibit ranges of values for certain light parameters. The user can also authorise the adjustment of certain light parameters, or the application of certain ranges of values for certain light parameters, but only on one or more time slots that they themselves have defined. In this case, the processing unit 9 acquires the current time and verifies the condition(s).

The verification of the condition(s) on the applicability of the first current values of the light parameters is an optional step.

The processing unit 9 then verifies, before transmitting the first command C1 to the lighting device 12, that the first current values are compatible with the operation of the lighting device 12: step E6.

The processing unit 9 therefore verifies the matching of the first current values of the light parameters with respect to the capacities of the lighting device 12 (and therefore also the capacity of the lighting device 12 to act on said light parameters to adjust the ambient light).

For example, certain lighting devices could not enable the adjustment of the colour temperature, while they enable the adjustment of the luminosity.

The values of the parameters could also be outside of the admissible range by the lighting device. For example, the colour temperature setpoint of a programme could be 5000° K, while the lighting device 12 makes it possible to adjust the colour temperature, only over a range going from 2700° K to 4500° K. In such a case, the processing unit 9 will thus limit the values of said parameter to the admissible range (4500° K, in this example).

For this, the processing unit 9 acquires functional features of the lighting device 12, which are transmitted to it by the control unit 14.

Step E6 is optional.

The processing unit 9 thus applies the new values of the light parameters: step E7. The processing unit 9 sends the first command C1 which indicates to the control unit 14, the first current values of the light parameters to be applied, which are associated with the first current programme.

It can be provided that the light adjustments are only applied when a user is detected in the room, in order to avoid useless unintentional adjustments. This is, for example, the set-top box 1 which detects the presence of the user in the room. The processing unit 9 thus verifies, before transmitting the first command to the lighting device 12, that the user is actually present in the room. The processing unit 9 uses, for this, a presence detection device. This device is, for example, integrated in the set-top box 1. The detection device comprises, for example, the camera of the set-top box 1, coupled with a person detection algorithm, which could, for example, be run on an NPU-type coprocessor included in the processing unit 9.

The set-top box 1 could use any other type of detection device, making it possible to verify a user presence. It could use its proximity sensor, or its microphones coupled with a noise and/or voice detection algorithm.

The set-top box 1 could also acquire information on the user presence, which would be transmitted by another piece of equipment.

This step is optional.

Optionally also, the light adjustments resulting from the application of the first current values of the light parameters are progressively applied, for example for an adjustment duration of a few seconds (3 seconds, for example).

Optionally, again, the adjustment duration can be different, according to the light parameters. For example, the adjustment duration of the light intensity can be defined at 2 seconds, while the adjustment duration of the colour temperature can be defined at 30 seconds.

Optionally, the preceding lighting state is restored at the end of the first current programme (or a predetermined time before the end of the programme, for example, equal to 10 seconds), in order to reestablish the lighting under its initial conditions (such as before the adjustment).

Optionally, the lighting could be adjusted before the start of the first current programme. In particular, in the case where the transition is progressive, it is possible to make sure that the end of the transition coincides with the start of the first current programme.

Now, more specifically step E5 is covered, i.e. the way in which the processing unit 9 determines the adjustment of the light parameters.

In reference to FIG. 3, the processing unit 9 of the set-top box 1 recovers first programme information Ip1 linked to the first current programme, the broadcasting of which has just started: step E10.

The processing unit 9 recovers, for example, this first programme information Ip1 in a first database 20 called, in this case, "programme database" comprising programme information Ip. The processing unit 9 accesses the first programme information Ip1 via the ID (identifier) of the first current programme.

The programme information Ip comprises metadata making it possible to classify the programme, and for example, an ID of the programme, an ID of the genre and/or of the sub-genre of the programme, an ID of the channel. The genre and the sub-genre are, for example, defined according to DVB (Digital Video Broadcasting) standards. The programme information also contains the start and end time of the programme, which are necessary to verify, in particular, the remaining duration, or to perform the transition before the start of the programme.

The genre of a programme is, for example, "sport", or "film". A sub-genre of the "sport" genre is, for example, "football" or "athletics". A sub-genre of the "film" genre is, for example, "action film" or "comedy".

The programme information Ip can be obtained by the set-top box 1 from an external data source 21 (which can be seen in FIG. 1). The set-top box 1 obtains this programme information by a suitable means 22 (IP, DSL, cable, satellite connection, etc.).

The programme information Ip covers, as a minimum, the information relating to the programme being viewed (first current programme), but can also cover all of the available programmes, immediately or in a close future (for example, in the next 7 or 14 days).

The programme information can be sent to the set-top box 1 in EIT (Event Information Table) form, as defined in the ETSI TS 101 211 (DVB) standard, or in any other suitable form.

The programme information can also be contained in the manifest file (e.g. in the case of a DASH or HLS broadcast).

The external source 21 comprises, for example, a telecom operator server (in the case of an IP broadcast), or a server of the broadcaster, or also the server of a third party providing additional metadata linked to the programmes. The server can optionally be interrogated on request by the set-top box 1.

The programme database 20 can be stored locally in the set-top box 1 (for example, via a periodic downloading, and for example, in one of the memories 11), or be located on a remote server.

If the programme database 20 does not contain first programme information Ip1 associated with the first current programme, the processing unit 9 can optionally replace them with genre/sub-genre information of the channel comprising the programme.

The processing unit 9 thus accesses a second database 23, called, in this case, "light parameter base". The light parameter base 23 comprises reference values Vref of light parameters associated with programme metadata.

The programme metadata comprise, in this case:
- first IDs, which each identify a particular programme;
- second IDs, which each identify a programme genre or sub-genre;
- third IDs, which each identify a channel broadcasting programmes.

The processing unit 9 attempts to determine the first current values Vc1 of the light parameters, which best correspond to the first current programme, by using the first programme information Ip1 coming from the programme database 20 and associated with the first current programme. The processing unit 9 recovers the first current values of the light parameters: step E11.

Once the processing unit 9 has recovered the first current values of the light parameters, the method returns to step E6 (of FIG. 2).

Now, the light parameter base 23 is covered.

In a first embodiment, the light parameter base 23 comprises first reference values Vref1 of the light parameters associated with first programme metadata, said first reference values being defined by the user.

The adjustment of the light parameters therefore corresponds to a learning based on the user actions: the base 23, which can be local (and therefore stored in the set-top box 1, and for example, in one of the memories 11) or remote, is supplied by the user actions.

Still in reference to FIG. 3, the way in which the base 23 is supplied is described.

When the user views a second current programme Pc2, which is therefore being broadcast, new light parameters are applied (for example, upon the start of the second current programme): step E6'. This step E6' is, in this case, optional. This step is called E6' and not E7: step E7 is indeed required in the implementation of the management method represented in FIG. 2, while step E6' is only optional in the implementation of the method of FIG. 3. In the case of FIG. 3, when the user views the second current programme, it is indeed not necessary that new parameters have been applied at the start of the broadcasting, such that the user themselves adjusts the light parameters.

The user thus decides to adjust the ambient light: step E12. They send a second command C2, to this end, to the set-top box 1, by using, for example, the remote control 5 (and therefore, via the connection 7). Alternatively, the user sends a command to the control unit 14 which notifies the set-top box 1.

The processing unit 9 receives the second command, and produces second current values Vc2 of the light parameters according to the second command.

The processing unit 9 thus transmits a third command C3 to the control unit 14 of the lighting device 12, such that this adjusts the ambient light according to said second current values.

The set-top box 1 thus stores the second current values Vc2 in the light parameter base 23, by associating them with the metadata of the second current programme Pc2. The first reference values Vref1 of the light parameters of the light parameter base 23 thus now comprise the second current values Vc2, and the first programme metadata thus comprise said metadata of the second current programme.

The processing unit 9 therefore stores, in the light parameter base 23, the second current values of the light parameters associated with a first ID of the second current programme and, optionally, with a second ID of the genre and/or to the sub-genre of the second current programme and/or to a third ID of the channel broadcasting the second current programme, and/or at the current time.

Before storing the second current values Vc2 of the light parameters in the light parameter base 23, the processing unit 9 verifies that, following the receiving of the second command C2, the user has not attempted to adjust, again, the ambient light for a predefined duration Td. The predefined duration is, for example, equal to 30 seconds or 1 minute.

The set-top box 1 thus ensures that the user leaves the light parameters at their value (and therefore, makes no more adjustments). This step is optional.

The light adjustment of the first embodiment is therefore, an adjustment based only on the user actions, without prior information. The light parameter base does not require to be supplied by a third-party external system.

Now, in reference to FIG. 4, step E11 is covered, i.e. the recovery of the first current values Vc1 of the light parameters, corresponding to the first current programme.

The processing unit 9 recovers, in the programme database 20, the first programme information Ip1 associated with the first current programme: step E20.

Then, the processing unit 9 accesses the light parameter base 23. The processing unit 9 will select, in the light parameter base 23, first current values Vc1 of the light parameters, which are associated with programme metadata corresponding to the first current programme Pc1.

For this, the processing unit 9 first verifies that the programme metadata of the light parameter base 23 actually comprise a first ID of the first current programme: step E21.

If this is the case, the processing unit 9 selects the reference values of the light parameters associated with the first ID, which become the first current values Vc1: step E22.

If this is not the case, the processing unit 9 verifies that the programme metadata of the light parameter base 23 comprise a second ID of a genre and/or of a sub-genre of the first current programme: step E23.

If this is the case, the processing unit 9 selects the reference values associated with said second ID, which therefore become the first current values Vc1: step E22.

If the programme metadata of the light parameter base 23 does not contain the second ID, the processing unit 9 verifies that the programme metadata comprise a third ID of a channel on which the first current programme is broadcast: step E24.

If this is the case, the processing unit 9 selects the reference values associated with the third ID, which therefore become the first current values Vc1: step E22.

If the light parameter base 23 does not contain the third ID, the processing unit 9 selects default values Vd of the light parameters: step E25. These default values Vd therefore become the first current values Vc1: step E22.

Step E25 is optional, as in the case where no correspondence has been found in the preceding steps, the processing unit 9 could either apply from the default values, or not apply from new parameters (the current values are preserved).

It is noted that for each of the steps E21, E23, E24, E25, the processing unit 9 can also consider the current time for choosing the parameters from the base.

For example, the processing unit 9 can only retain, during the search in the light parameter base 23, the reference values of light parameters previously applied by the user in a predefined time slot extending before and/or after the current time. The predefined duration is, for example, equal to 60 minutes, and the slot thus starts 30 minutes before the current time, and finishes 30 minutes after the current time. This makes it possible to have light parameter values which change during the day (e.g. different day and evening parameters).

Again, determining the adjustment of the light parameters is covered.

In a second embodiment, in reference to FIG. 5, the light parameter base 23 comprises second reference values Vref2 of the light parameters, associated with second programme metadata.

The second reference values Vref2 are stored in the light parameter base 23 by a third-party external system. The light adjustment is therefore an adjustment with prior information.

In this case, by "third-party external system", this means, for example, a content (programme) broadcaster, a telecom operator (in the case of an IP broadcasting), or an external data supplier. The external data supplier provides, on a server, additional metadata linked to the programmes.

Again, the light parameter base 23 can be stored locally in the set-top box 1 (for example, via a period downloading), or be located on a remote server.

Step E30, using the programme database 20, occurs similarly to step E10.

Step E30 could be optional, by being replaced directly by step E31.

In step E31, the processing unit 9 uses the programme information Ip (programme ID, or failing that, genre of the programme, or failing that, channel ID, or failing that, channel genre) to recover, from the light parameter base 20, the target light parameters to be used with the programme.

Optionally, steps E30 and E31 can be combined, for example if the programme information directly contains the light parameter information. This could, for example, be the case in a DVB environment, if the light parameters are contained in a private EIT field.

In a third embodiment, the light parameter base 23 can comprise both first reference values Vref1 of the light parameters (coming from the learning based on the user actions), and second reference values Vref2 (provided by the third-party system).

If, for the first current programme, first reference values Vref1 and second reference values Vref2 are present in the light parameter base 23, the processing unit 9 gives priority to the first reference values (and therefore to the adjustment information defined by the user; the optional step E25 will not be performed). If the light parameter base 23 does not contain first reference values corresponding to the first current programme, then the processing unit 9 will try to obtain second reference values corresponding to the first current programme.

This makes it possible to have a system providing "basic" adjustments, while favouring the consideration of the habits of the user.

The adjustment of the ambient light, performed by the external device, can comprise one or more light adjustments of different parameters, and for example:

an adjustment of the light intensity;

an adjustment of the colour;

an adjustment of the colour temperature.

The values of the light parameters can be absolute or relative values.

For example, for a programme of the "film" genre and of the "adventure film" sub-genre, the values of the light parameters can be, for example:

low light intensity of 20%;

colour temperature of 2800° K.

For a programme of the "sport" genre, the values of the light parameters can be, for example:

colour temperature of 4000° K.

For a programme of the "information" genre, the values of the light parameters can be, for example:

colour temperature of 3500° K.

It is optionally possible to define applicable limits to the values of the light parameters to be modified (for example, via internal adjustments of the set-top box, or via user parameters). For example, the user could restrict the adjustment of the colour temperature, such that this does not exceed 4000° K, or restrict the adjustment of the light intensity, such that this is always at least 30% of the maximum value.

As has already been mentioned, these limits can advantageously be combined with time restrictions, like for example, authorising the full range of colour temperature adjustment during the day, and restrict the maximum temperature to 3500° K over the time range 21 hours-6 hours. In the preceding example of the programme of the "sport" genre, this programme will therefore trigger a colour temperature of 4000° K in the day, but only a temperature of 3500° K during the night range, which will reduce the exposure of the user to blue light.

Naturally, the invention is not limited to the embodiments described, but comprises any variant entering into the field of the invention.

The architecture of the set-top box can, of course, be different from that described, in this case. The communication module enabling the set-top box to control the lighting device is not necessarily integrated in a home automation controller, itself integrated in the set-top box: this could be any type of communication module. The set-top box could also communicate with the lighting device via a home automation interface (distinct from the set-top box and from the lighting device).

The set-top box does not necessarily comprise all the components described, in this case. A person skilled in the art understands that the camera, the microphones, etc. are not necessary for the implementation of the invention.

The set-top box and the lighting device could be integrated in one same piece of equipment.

The control unit and the light sources of the lighting device could be integrated in one same piece of equipment.

The order of certain steps of the method for managing ambient light can be modified (and in particular, the order of steps E2, E3, E4).

The viewing device is not necessarily a television. This could be, for example, a video projector or any other device being able to be connected to a set-top box.

The invention claimed is:

1. A method for managing ambient light, implemented in a set-top box which is connected to a viewing device and to a lighting device arranged to adjust ambient light, the management method comprising the steps of:

detecting a start of a broadcasting of a first current programme;

accessing a light parameter base comprising reference values of light parameters associated with programme metadata;

selecting, in the light parameter base, first current values of said light parameters, which are associated with programme metadata corresponding to the first current programme;

transmitting a first command to the lighting device, such that the lighting device adjusts the ambient light according to said first current values of the light parameters, the light parameter base comprising first reference values of the light parameters associated with first programme metadata, said first reference values being defined by the user, the set-top box being arranged to:

receive a second command from a user who wishes to adjust the ambient light while a second current programme is being broadcast;

producing second current values of the light parameters according to the second command;

transmitting a third command to the lighting device, such that the lighting device adjusts the ambient light according to said second current values;

storing the second current values in the light parameter base by associating them with metadata of the second current programme, such that the first reference values thus comprise the second current values, and the first programme metadata thus comprise said metadata of the second current programme.

2. The method according to claim 1, wherein the set-top box is arranged to, before storing the second current values in the light parameter base, verify that, following the receiving of the second command, the user has not attempted to adjust the ambient light again for a predefined first duration.

3. The management method according to claim 1, wherein the light parameter base comprises second reference values of the light parameters associated with second programme metadata, said second reference values being stored in the light parameter base by a third-party external system.

4. The management method according to claim 1, wherein the set-top box is arranged to wait for the first current programme to be broadcast for a predefined second duration before transmitting the first command to the lighting device.

5. The management method according to claim 1, wherein the set-top box verifies, before transmitting the first command to the lighting device, that at least one predefined third duration of the first current programme to be broadcast still remains.

6. The management method according to claim 1, wherein the set-top box verifies, before transmitting the first command to the lighting device, that the user remains on a channel broadcasting the first current programme for at least one predefined fourth duration.

7. The management method according to claim 1, wherein the set-top box verifies, before transmitting the first command to the lighting device, that the first current values are compatible with an operation of the lighting device.

8. The management method according to claim 1, wherein the set-top box comprises a detection device arranged to detect a presence of the user in a room, wherein the set-top box is located, and wherein the set-top box is arranged to verify, before transmitting the first command to the lighting device, that the user is actually present in said room.

9. The management method according to claim 1, wherein the set-top box is arranged to, when it selects in the light parameter base, the first current values according to the first current programme:

verify that the programme metadata of the light parameter base comprise a first ID of the first current programme;

if this is the case, select the reference values associated with the first ID;

if this is not the case, verify that the programme metadata comprise a second ID of a genre and/or of a sub-genre of the first current programme and, if this is the case, select the reference values associated with the second ID.

10. The management method according to claim 9, wherein the set-top box is arranged to, if the programme metadata of the light parameter base does not contain the second ID:

verify that the programme metadata comprise a third ID of a channel on which the first current programme is broadcast and, if this is the case, select the reference values associated with the third ID.

11. The management method according to claim 10, wherein the set-top box is arranged to, if the light parameter base does not contain the third ID, select default values of the light parameters.

12. The management method according to claim 1, wherein the light parameter base is stored in the set-top box.

13. A set-top box comprising a processing unit, wherein the method according to claim 1 is implemented.

14. A non-transitory computer-readable recording medium, on which a computer program comprising instructions which make a processing unit of a set-top box run the steps of the method according to claim 1 is recorded.

* * * * *